(12) United States Patent
Althaus

(10) Patent No.: US 9,918,356 B2
(45) Date of Patent: Mar. 13, 2018

(54) HEATING ELEMENT AND METHOD FOR PRODUCING A HEATING ELEMENT

(71) Applicant: Margarete Franziska Althaus, Schmallenberg (DE)

(72) Inventor: Margarete Franziska Althaus, Schmallenberg (DE)

(73) Assignee: Thermofer GmbH & Co. KG, Cologne (DE)

( * ) Notice: Subject to any disclaimer, the term of this patent is extended or adjusted under 35 U.S.C. 154(b) by 404 days.

(21) Appl. No.: 14/274,946

(22) Filed: May 12, 2014

(65) Prior Publication Data
US 2014/0339217 A1    Nov. 20, 2014

Related U.S. Application Data

(63) Continuation of application No. PCT/EP2012/072561, filed on Nov. 14, 2012.

(30) Foreign Application Priority Data

Nov. 16, 2011    (DE) .......................... 10 2011 086 448

(51) Int. Cl.
| | |
|---|---|
| *H05B 3/34* | (2006.01) |
| *H05B 3/14* | (2006.01) |
| *F24D 3/12* | (2006.01) |
| *H01C 17/06* | (2006.01) |
| *H01C 17/28* | (2006.01) |

(Continued)

(52) U.S. Cl.
CPC .............. *H05B 3/145* (2013.01); *F24D 3/12* (2013.01); *H01C 17/06* (2013.01); *H01C 17/28* (2013.01); *H05B 3/03* (2013.01); *H05B 3/342* (2013.01); *H05B 3/347* (2013.01);
(Continued)

(58) Field of Classification Search
CPC .. F24D 3/12; H05B 3/342; H05B 3/03; H05B 3/145; H05B 3/347; H05B 2203/032; H05B 2214/04; H01C 17/06; H01C 17/28; Y02B 30/26; Y10T 29/49083
See application file for complete search history.

(56) References Cited

U.S. PATENT DOCUMENTS

| | | |
|---|---|---|
| 4,429,216 A | 1/1984 | Brigham |
| 4,845,343 A | 7/1989 | Aune et al. |

(Continued)

FOREIGN PATENT DOCUMENTS

| | | |
|---|---|---|
| DE | 19819900 | 11/1999 |
| DE | 20 2010 009208 U1 | 9/2010 |

(Continued)

*Primary Examiner* — David Angwin
*Assistant Examiner* — John J Norton
(74) *Attorney, Agent, or Firm* — Von Rohrscheidt Patents

(57) ABSTRACT

The invention relates to a heating element for a room in a building having a flat support which includes carbon nanotubes and a plurality of contacts, wherein the carbon nanotubes can be excited to infrared emission by connecting an electrical voltage to the contacts. The invention further relates to a method for producing such heating element, the support thereof being attached to a wall of the room. In order to simplify the heating element, according to the invention the support includes a flexible textile material in which the contacts are embedded and to which the carbon nanotubes are applied in an aqueous dispersion and the water is evaporated.

6 Claims, 1 Drawing Sheet

(51) Int. Cl.
*H05B 3/03* (2006.01)
*C08J 5/12* (2006.01)
*C08J 5/04* (2006.01)

(52) U.S. Cl.
CPC .... *H05B 2203/032* (2013.01); *H05B 2214/04* (2013.01); *Y02B 30/26* (2013.01); *Y10T 29/49083* (2015.01)

(56) References Cited

U.S. PATENT DOCUMENTS

| | | | | |
|---|---|---|---|---|
| 4,856,240 | A * | 8/1989 | McHale | E04B 1/648 |
| | | | | 52/169.14 |
| 9,185,748 | B2 * | 11/2015 | Zimmerer | F24D 13/022 |
| 9,578,691 | B2 * | 2/2017 | Erismis | H05B 3/26 |
| 2007/0295714 | A1 | 12/2007 | Liu et al. | |
| 2008/0290080 | A1 * | 11/2008 | Weiss | H05B 1/0238 |
| | | | | 219/202 |
| 2009/0200285 | A1 * | 8/2009 | Raidt | F24D 13/022 |
| | | | | 219/213 |
| 2010/0126981 | A1 * | 5/2010 | Heintz | C08F 259/08 |
| | | | | 219/482 |
| 2011/0036828 | A1 * | 2/2011 | Feng | H05B 3/342 |
| | | | | 219/529 |
| 2012/0118873 | A1 * | 5/2012 | Erismis | H05B 3/26 |
| | | | | 219/546 |

FOREIGN PATENT DOCUMENTS

| | | | |
|---|---|---|---|
| DE | 202010009208 U1 * | 9/2010 | ............ H05B 3/34 |
| EP | 0144187 | 6/1985 | |
| EP | 2268102 A1 | 12/2010 | |
| EP | 2400814 | 12/2011 | |

* cited by examiner

HEATING ELEMENT AND METHOD FOR PRODUCING A HEATING ELEMENT

RELATED APPLICATIONS

This application is a continuation of International patent application PCT/EP2012/072561 filed on Nov. 14, 2012 claiming priority from German patent application DE 10 2011 086 448.2 filed on Nov. 16, 2011. Both of which are incorporated in their entirety by this reference.

FIELD OF THE INVENTION

The invention initially relates to a room in a building which room includes a heating element that is applied to a wall of the room and includes a flat carrier made from a flexible textile material into which contacts are integrated and onto which carbon nanotubes are applied in a watery dispersion, wherein the water is evaporated and wherein the carbon nanotubes are excitable by applying an electric voltage to the contacts to provide infrared emissions. The invention furthermore relates to a method for producing the room.

BACKGROUND OF THE INVENTION

Carbon nanotubes (CNT) are very small carbon tubes which conduct an electrical current when a voltage is applied wherein their conductivity significantly exceeds a conductivity of copper. When current passes through the CNT are energetically excited and emit thermal radiation in a far infrared range with an energetic efficiency of over 95% when falling back to their original condition. CNT are thus particularly suited for heating rooms since humans react quite well to this type of heat radiation.

DE 20 2010 009 208 U1 discloses a room of the general type recited supra with a CNT based heating element configured as a paintable wall paper.

In order to produce a CNT based heating element DE20 2011 001 126 U1 proposes to provide the carbon nanotubes in an emulsion of an evaporating solvent with a curing plastic material directly onto an accordingly prepared wall of the room as a flat carrier and to optionally provide the carbon nanotubes on the room side with a textile reinforcement to protect them against abrasion.

CNT based heating elements with a separate flat carrier which includes carbon nanotubes and a plurality of contacts wherein the carbon nanotubes are excitable to provide infrared emissions by applying an electric voltage to the contacts are furthermore known from DE 10 2009 008 967 B4, DE 10 2009 034 306 A1, DE 20 2006 007 228 U1, DE 20 2007 014 328 U1, DE 20 2005 014 678 U1, DE 20 2008 007 815 U1, DE 20 2009 000 136 U1 and WO 2007/089118 A1. The carriers of these CNT based heating elements are rigid so that the heating elements can be mounted as separate components in front of a wall of a building.

BRIEF SUMMARY OF THE INVENTION

It is an object of the invention to provide a simplified heating element.

Improving upon known heating elements it is proposed according to the invention that the carrier is a glass fiber reinforcement grid that is filled with a filler.

The textile material is a flat contexture of fibers and can be provided with the carbon nanotubes in particular in a 1% to 10% dispersion through spraying, dipping, printing or brushing before or also through spraying or brushing after being applied to a wall. The provision can be performed in plural steps in order to increase a density of the carbon nanotubes. The provision can be performed in a controlled uneven manner, for example with a density of the carbon nanotubes that increases in one direction in order to accommodate changing heat requirements in a direction of the room.

Contacts fabricated into the textile provide uniform and good quality contacting of the carbon nanotubes on the one hand side also during operations of the heating element with changing temperatures. Through fabricating the contacts into the textile it is assured that the contacts are completely coated with nanotubes so that an optimum electrical contact is provided with minimum transition resistance. In a layered configuration this is not provided. On the other hand side the heating element can be prefabricated in a particularly simple manner to be mounted on a wall.

The textile in a room according to the invention is a glass fiber reinforcement grid. Using glass fiber mats in different configurations in walls of buildings is generally known.

Advantageously the textile in a room according to the invention is a woven material with warp threads and weft threads. Fabrics have a particularly even surface and furthermore a particularly small thickness.

In a room of this type according to the invention the thread shaped contacts are advantageously fabricated into the woven material as warp or weft threads.

Advantageously the contacts in a room according to the invention are made from copper. Alternatively any conductive material can be used for the contacts, in particular also silver or silver plated copper threads advantageously with 10-20 strands.

Improving upon the known methods it is proposed according to the invention that the carrier is a glass fiber reinforcement grid and filled with a filler. The method according to the invention through which a room is produced as described supra provides the same advantages of the space. Applying the textile carrier onto the wall simplifies and accelerates mounting a CNT based heating element significantly compared to the known application of a curing plastic material. As known in the field of processing reinforcement grids the carrier can for example can be glued or nailed to the wall.

Furthermore subsequent to applying the carbon nanotubes to the textile, a water repellant and electrically insulating protective layer can be applied in the same manner according to a method according to the invention. A textile thus configured can thus be treated in particular with water containing materials, for example painted over using commercial wall papering glue.

According to a method according to the invention the heating element can be advantageously wall papered over or tiled over. The heating element is thus completely covered and one cannot tell the difference from the rest of the wall anymore. A heating element according to the invention is particularly suited for rooms that cannot be heated in any other manner for reasons of monument protection. The method according to the invention is suited for new construction but also for remodeling.

Alternatively the heating element can also be left on the wall without a cover or it can be provided with a covering that is permeable to infrared radiation. This way specific radiation characteristics of the carbon nanotubes can be used in particular for therapeutic purposes.

The surface of the wall oriented towards the room can also be configured with pigments that illuminate or change their colors under infrared light. When the carbon nanotubes are applied to the textile in a decorative pattern with changing density the pattern becomes visible during operation of the heating element.

Furthermore the carrier can be filled with insulation stucco as a base, so that the insulation effect is increased and an outer insulation can be omitted. Other insulation materials are also feasible as a base.

BRIEF DESCRIPTION OF THE DRAWINGS

The invention will be described now based on an embodiment with reference to drawing figures, wherein.

DETAILED DESCRIPTION OF THE INVENTION

Figure 1:
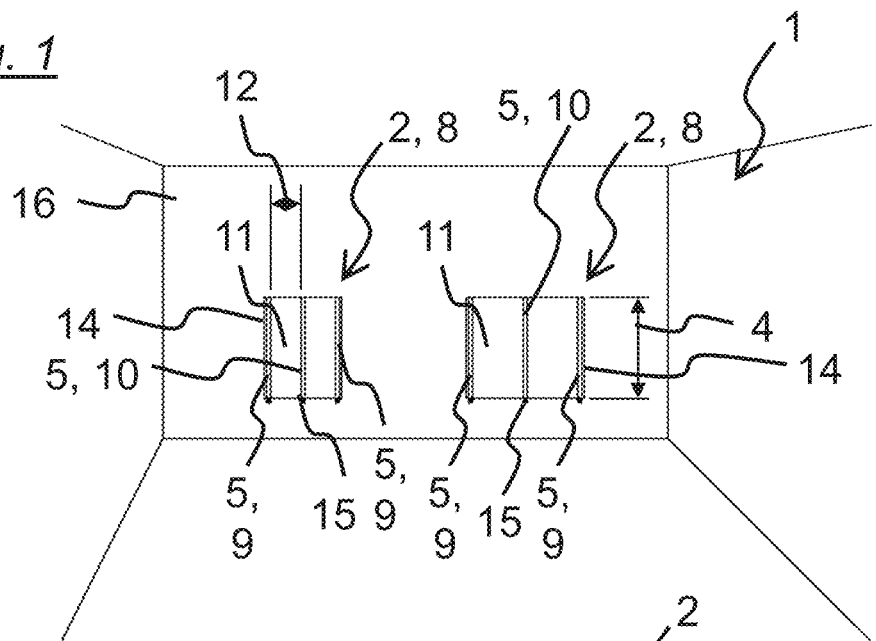
FIG. 1 illustrates a room according to the invention.
Figure 2:
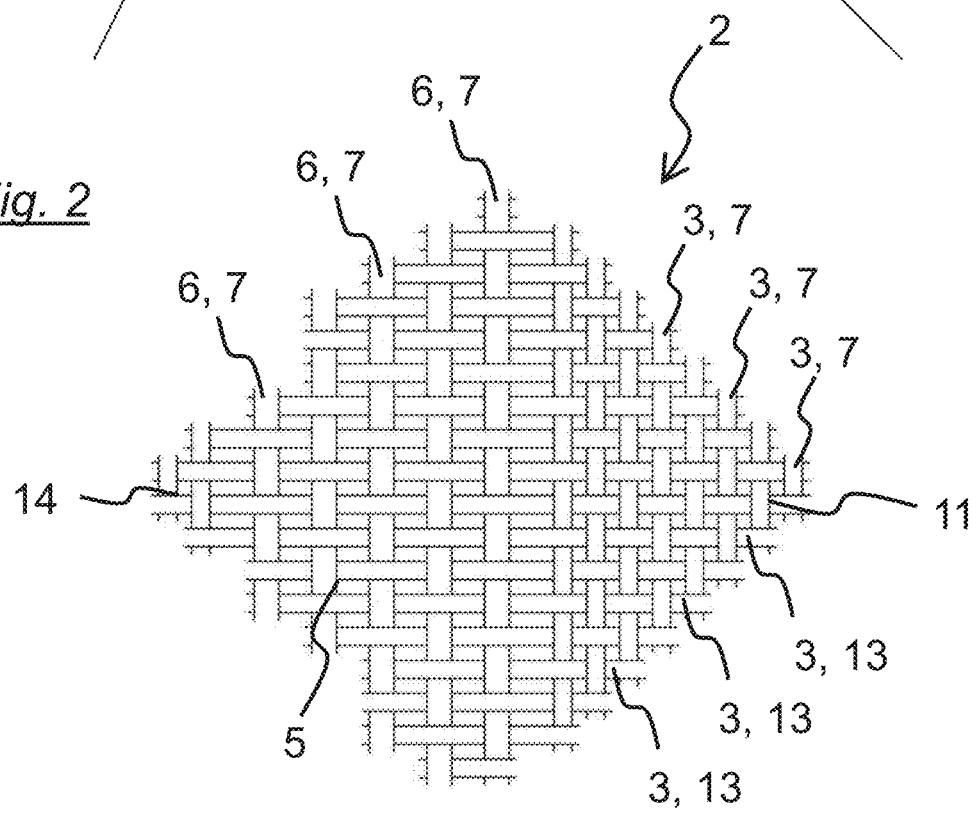
FIG. 2 illustrates a carrier base according to the invention.

The invention is subsequently described with reference to an embodiment. In a room according to the invention the carrier base is a woven textile material made from glass fiber threads with a mesh of 4×4 mm and a width of 1 meter configured as endless roll material. The textile material includes flat contact portions in which at least 5 copper threads are woven in instead of glass fiber threads with a distance that is as small as possible for 10 respective subsequent weft threads.

The roll material is configured for producing mats which respectively include a contact portion at two opposite edges and there between in a center. After a first contact portion there is an intermediary portion with a width of 30 cm in a direction of the warp threads, in another embodiment a second contact portion follows after approximately 50 cm with another intermediary portion and a third contact portion which is followed by a separation portion with a width of 5 cm.

Carbon nanotubes in a 3% watery dispersion are applied to the finished woven textile through imprinting or dipping. Through repeated coating three different textiles with different electrical resistances are produced for different supply voltages. A resistance of 2 to 3Ω for 12 V, 10 to 12Ω for 48 volt and 150 to 170Ω for 230 V supply voltage. The heating elements then reach surface temperatures of 35-40° C., for larger rooms and warehouses also 50° C. and more.

The configuration of the textile material is completed by application of a water repellant and electrically insulating protective layer made from styrol-butadiene or polyurethane in another embodiment also made from latex. Thereafter the carrier configured with the carbon nanotubes and the protective layer is cut in the separation portions into mats. In order to complete the heating elements clamping plugs configured as electrical connections are attached at the contact portions.

Three to four heating elements thus preconfigured are glued to inner walls of each room in a newly constructed building or in an existing apartment or the heating elements are mechanically attached at the wall, filled with lime or clay stucco and covered with wall paper as required. The connectors are run out of the stucco or connected with supply lines that are also arranged under the stucco.

The heating elements can be connected in series or in parallel. For a parallel connection each heating element can be controlled individually. The heating elements can be turned on and off through temperature sensors when a room temperature is set and/or through a self learning control system.

The heating power of each heating element or of all heating elements of a room or another unit can be controlled through the connection voltage or through different switching of the contacts. Compared to the standard case in which the operating voltage is applied between the two outer contacts the resistance is cut in half and the heating power is doubled when the operating voltage is applied between the center contact and only one of the outer contacts. Accordingly the resistance is down to a quarter compared to the standard case and the heating power is quadrupled when the operating voltage is applied between the center contact and the two outer contacts.

What is claimed is:

1. A method for producing a heating element on a wall of a room in a building, comprising the steps:
    configuring a flexible heating element by
        fabricating contacts into a flexible textile material,
        applying carbon nanotubes to the flexible textile material in a water based dispersion,
        applying a water repelling and electrically insulating protective layer to the flexible textile material after applying the carbon nanotubes,
        evaporating the water to form the flexible heating element;
    applying the flexible heating element to a wall of a room to form the heating element on the wall; and
    filling the heating element on the wall with a filling material consisting essentially of nonconductive filler,
    wherein the carbon nanotubes are excitable to provide an infrared emission through applying an electrical voltage to the contacts, and
    wherein the textile material is a glass fiber reinforcement grid.

2. The method according to claim 1, comprising the step: covering the heating element with wall paper or tiles.

3. The method according to claim 1, wherein the flexible textile material is a woven material with warp threads and weft threads.

4. The method according to claim 3, wherein the contacts are fabricated in the woven material as warp threads or weft threads.

5. The method according to claim 1, wherein the contacts are made from copper.

6. The method according to claim 1, wherein the filler is made from clay or lime stucco and fixates the textile material at the wall.

* * * * *